J. MOONEY.
FRUIT-PICKER.

No. 171,482. Patented Dec. 28, 1875.

WITNESSES,

INVENTOR,
John Mooney
Per Charles L. Spencer
Atty.

UNITED STATES PATENT OFFICE.

JOHN MOONEY, OF PROVIDENCE, RHODE ISLAND.

IMPROVEMENT IN FRUIT-PICKERS.

Specification forming part of Letters Patent No. 171,482, dated December 28, 1875; application filed September 27, 1875.

*To all whom it may concern:*

Be it known that I, JOHN MOONEY, of the city and county of Providence, in the State of Rhode Island, have invented certain new and useful Improvements in Fruit-Pickers, of which the following is a full, clear, and exact description, which will enable others skilled in the art to make and use my invention, reference being had to the accompanying drawings making part of this specification, in which—

Figure 1:
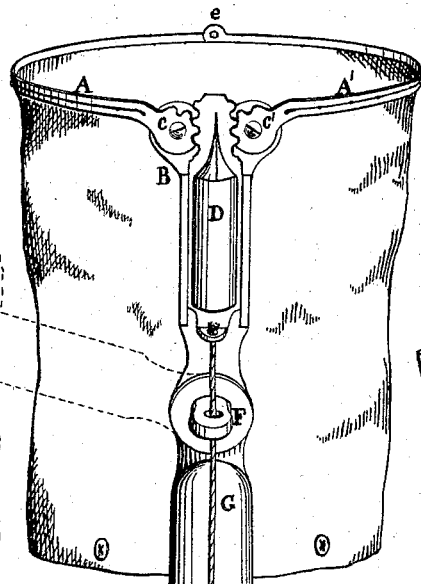
Figure 2:
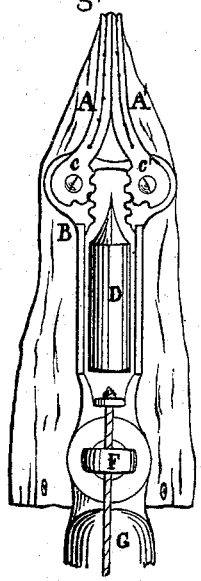
Figure 3:
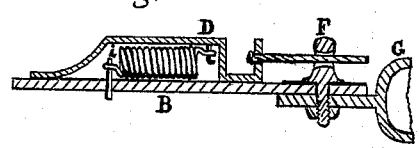
Figure 4:

Figure 1 represents a perspective view of my improved fruit-picker with its jaws opened, and having dotted lines to show different positions. Fig. 2 represents a perspective view of the jaws when closed. Fig. 3 represents a sectional view of the operating slide-rack. Fig. 4 represents a pouch or bag for receiving the fruit, and as worn upon the back of the gatherer.

My improvement relates to that class of inventions whereby the labor in hand-picking and handling fruit is much lessened, and without injuring or bruising the fruit. It consists in a jointed segmental ring or jaws, in combination with a sliding rack, which rack is operated by a spring in spreading said jaws, and with a hinged frame for attaining such angles or positions as may be desired, together with a throat or conducting-pipe so arranged in connection with a receiving pouch or bag that the fruit may be easily delivered into any receptacle.

In the accompanying drawings, A A', Fig. 1, are circular jaws, which are provided with a groove upon the outside, and having small holes drilled through to the inside for the purpose of connecting a cloth conductor or throat. The end $e$ of said jaws are hinged together, but the ends $c$ and $c'$ are bent out of line from ends $e$, and are jointed to the frame B a suitable distance apart for a slide-rack, D, to pass between them, the teeth of rack D working into corresponding teeth or cogs formed on the ends $c$ and $c'$ of the aforesaid jaws. To the lower end of rack D a cord is attached, and, running through a guide-hole on screw F, it passes along the handle of the fruit-picker to the hands of the operator. By pulling this cord rack D is drawn downward, which closes the jaws A A', as represented in Fig. 2. When the cord is relaxed rack D is forced to its former position by the spiral spring $i$, Fig. 3, at the same time causing the jaws to spread open. Rack D is cast with an arched chamber for the spring $i$, which is connected therein by a small pin or hook extending from the top of the arch and passing through one end of said spring $i$, while the opposite end of the aforesaid spring is connected to the frame B. This frame, being provided with raised edges upon the front surface, forms a guide and place for rack D to slide in. One end of frame B is hinged to the ferrule G to attain such positions in the angle required in gathering fruit from difficult points. (Shown by dotted lines in Fig. 1.) To the jaws A A' a cloth throat or conductor is attached by sewing through the small holes hereinbefore mentioned drilled in the groove. Said conductor may be made of any required length by buttoning sections together. I make a receiving pouch or bag, H, Fig. 4, to be used in connection with the cloth conductor, said pouch or bag being strapped upon the back of the gatherer. When this pouch is filled its contents are discharged from an outlet which I make on the opposite side of the connection of the conducting-pipe.

It may be observed that in the use of my improved picker the jaws close over the fruit and around the stem, and the fruit is taken from the tree by pulling it off, as it naturally would be by hand.

Having thus described my invention, what I claim as new, and desire to secure by Letters Patent, is—

In a fruit-picker, the combination of the jaws A A', having the cogged ends $c$ $c'$, with the sliding rack D, meshing with the cogged ends of said jaws, substantially as described and shown.

JOHN MOONEY.

Witnesses:
 JOHN D. THURSTON,
 CHARLES L. SPENCER.